(12) United States Patent
Bell (10) Patent No.: US 8,314,681 B2
(45) Date of Patent: Nov. 20, 2012

(54) SYSTEM AND METHOD FOR AUTOMATIC KEY RECOGNITION

(75) Inventor: Dwayne A. Bell, Zephyr (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 692 days.

(21) Appl. No.: 12/463,653

(22) Filed: May 11, 2009

(65) Prior Publication Data

US 2010/0066487 A1    Mar. 18, 2010

Related U.S. Application Data

(60) Provisional application No. 61/097,953, filed on Sep. 18, 2008.

(51) Int. Cl.
*G06F 7/04* (2006.01)
(52) U.S. Cl. ........................................................ 340/5.6
(58) Field of Classification Search .................. 340/5.1, 340/5.2, 5.21, 5.5, 5.54, 5.6, 5.61, 5.64, 5.65, 340/5.66, 5.74, 5.8; 70/278.3; 713/186
See application file for complete search history.

(56) References Cited

U.S. PATENT DOCUMENTS

| | | | |
|---|---|---|---|
| 5,132,661 A * | 7/1992 | Pinnow | 340/5.28 |
| 6,107,935 A * | 8/2000 | Comerford et al. | 340/5.52 |
| 6,318,137 B1 * | 11/2001 | Chaum | 70/278.3 |
| 2002/0099945 A1* | 7/2002 | McLintock et al. | 713/186 |
| 2007/0241859 A1* | 10/2007 | Bhat et al. | 340/5.1 |

* cited by examiner

*Primary Examiner* — Nabil Syed
(74) *Attorney, Agent, or Firm* — Kacvinsky Daisak PLLC (57) ABSTRACT

A system and method are disclosed for using a single key to authenticate a user with respect to multiple user access points and to allow a single access point to authenticate multiple keys having different physical characteristics. The system may comprise an access control system that includes an insertion receptacle for receiving a physical key, and a translation device for observing the physical characteristics of the key and translating those characteristics into electrical signals. In a learning mode, the electrical signals are transmitted to a processor and stored in memory. In a verification mode, the electrical signals are transmitted to the processor and compared with the previously-stored signals. If the processor concludes that the signals match the signals stored in memory, then the processor instructs a lock actuation mechanism to actuate an access control device to allow the user access to a location. The translation device may comprise a laser light reader, a piezoelectric crystal, a variable resistor, an electromagnet, or an image acquisition device. A method of using the system is also disclosed.

26 Claims, 7 Drawing Sheets

SYSTEM AND METHOD FOR AUTOMATIC KEY RECOGNITION

CROSS-REFERENCE TO RELATED APPLICATIONS

This is a non-provisional of U.S. provisional patent application Ser. No. 61/097,953, titled "Light/Laser Key Reader," filed Sep. 18, 2008, by Dwayne A. Bell, the entirety of which application is incorporated by reference herein.

FIELD OF THE INVENTION

Embodiments of the invention relate to the field of authentication devices, and more particularly to systems and methods for using a single key or multiple keys to authenticate one or more users with one or more security/access system devices.

DISCUSSION OF RELATED ART

Security systems and access control systems are used in a variety of commercial and residential applications. Such systems respond to an input from a user, often in the form of a physical key, proximity tag or badge, or by inputting an access code to a keypad or other user input device. Mechanical keys engage with a set of numbers within a mechanical lock to provide the appropriate authentication. Electronic devices, such as proximity tags/badges or key codes, often verify the authority of the user by receiving the input information and referring to an electronic lookup table to verify whether the individual should be granted access to the associated area.

In residential applications a typical home owner may have one key for starting/locking their car, another for locking/unlocking the front door, and a third (usually electronic or keycode based) for arming/disarming their home security system. In commercial applications, a user may have multiple keys, badges, proximity tags or access codes, for gaining access to a variety of secure locations within one or more buildings.

It will be appreciated that carrying multiple keys, tags or badges can be cumbersome. In addition, remembering multiple pass codes can be difficult and subject to errors in recollection which can result in an otherwise authorized user being prevented from entering a secured building or area. This, there is a need for an improved system that enabled a user to provide authentication for a plurality of access-control systems: (e.g., auto, home, security) using a single user key (e.g., car key, house key), or that enables multiple users to provide authentication for a single access-control system using their own unique key. It would be advantageous for such a system to "learn" the unique aspects of the user key so that the user key can be employed to authenticate the user with respect to one or more of a variety of locks, security systems and/or access control systems.

SUMMARY OF THE INVENTION

A method for providing access is disclosed, comprising: at a controller, receiving electronic signal data representative of a contour of a first key presented by a first user at a first access location: comparing the electronic signal data with stored electronic signal data, the stored electronic signal data associated with an authorized key; and instructing the first access location to allow access to the user if the electronic signal data matches the stored electronic signal data.

A system is disclosed for access control, comprising a processor, a controller, a first access control device, and a machine-readable storage medium encoded with a computer program code. When the computer program code is executed by the processor, the processor performs the steps comprising: at a controller receiving electronic signal data representative of a contour of a first key presented by a first user at a first access location; comparing the electronic signal data with stored electronic signal data, the stored electronic signal data associated with an authorized key; and instructing the first access location to allow access to the user if the electronic signal data matches the stored electronic signal data.

DESCRIPTION OF EMBODIMENTS

The disclosed system will now be described more fully hereinafter with reference to the accompanying drawings, in which preferred embodiments are shown. It will be appreciated, however, that the system may be embodied in many different forms and should not be constructed as limited to the embodiments set forth herein. Rather, these embodiments are provided so that this disclosure will be thorough and complete, and will fully convey the scope of the invention to those skilled in the art. In the drawings, like numbers refer to like elements throughout.

A typical homeowner may have multiple access control devices (e.g., locks) to secure their home, business, car, boat, and/or other objects of value. Each access control device may require at least one key, passcode, proxy tag or other authentication source to allow user access.

Figure 1:
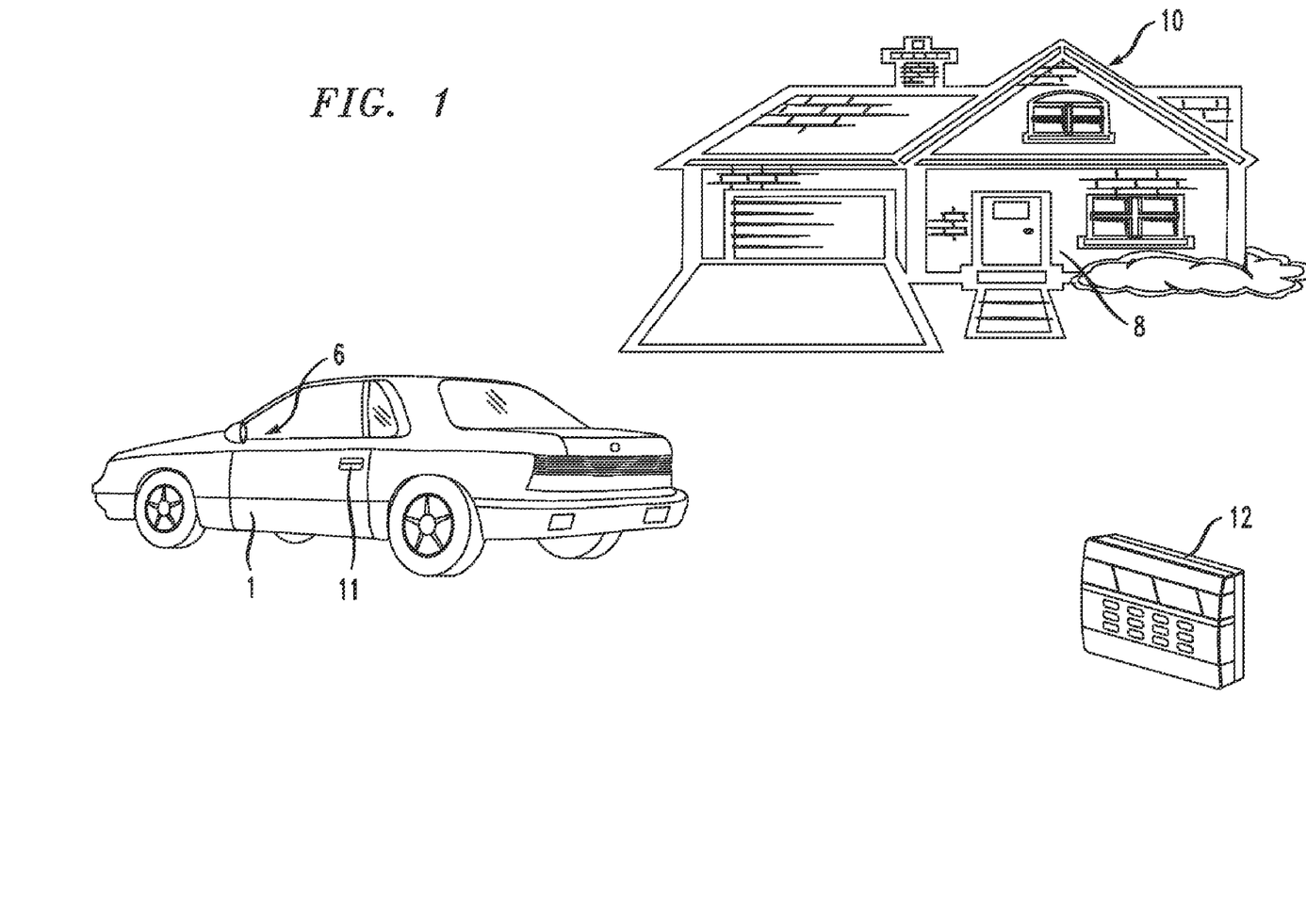
FIG. 1 is a schematic of a conventional arrangement in which multiple different keys are required for accessing a plurality of user devices and locations.

In the example shown in FIG. 1, a car 1 may require a first key for operating a door lock 4 and ignition 6. A second key may be required for operating a front door lock 8 and a third key may be required for operating a back door lock 10. In addition, for homes in which a security system is installed, a keypad 12 may be installed on an interior wall of the home to enable the homeowner to arm/disarm the security system from inside the home. Thus, in this simplified example the homeowner may be required to carry three or more different keys, and to remember at least one access code, to access and secure their car and home. Although the embodiment of FIG. 1 is described in relation to a residential application, it will be appreciated that a similar or large number of keys, tags and codes can be required for accessing secure areas in commercial, industrial, or other applications.

An access control system is disclosed for using a single key to authenticate a user with respect to multiple access points, or to enable multiple users to utilize their own unique keys to access a single access point. A non-limiting exemplary list of such access points may include a car ignition, a car door lock, a residence front door lock, a residence back door lock, and/or a residential security system. The system may include one or more of a variety of mechanical and electrical access controls. In one embodiment, a car ignition and car door lock may comprise mechanical tumbler-based access controls, while a residence front door lock, residence back door lock, and security system may comprise electronic access controls. It will be appreciated that the car ignition and/or door lock may also comprise electronic access controls in lieu of mechanical tumbler-based controls. The electronic access controls may be one or more of the type described in relations to FIGS. 3-6 below.

Figure 2:
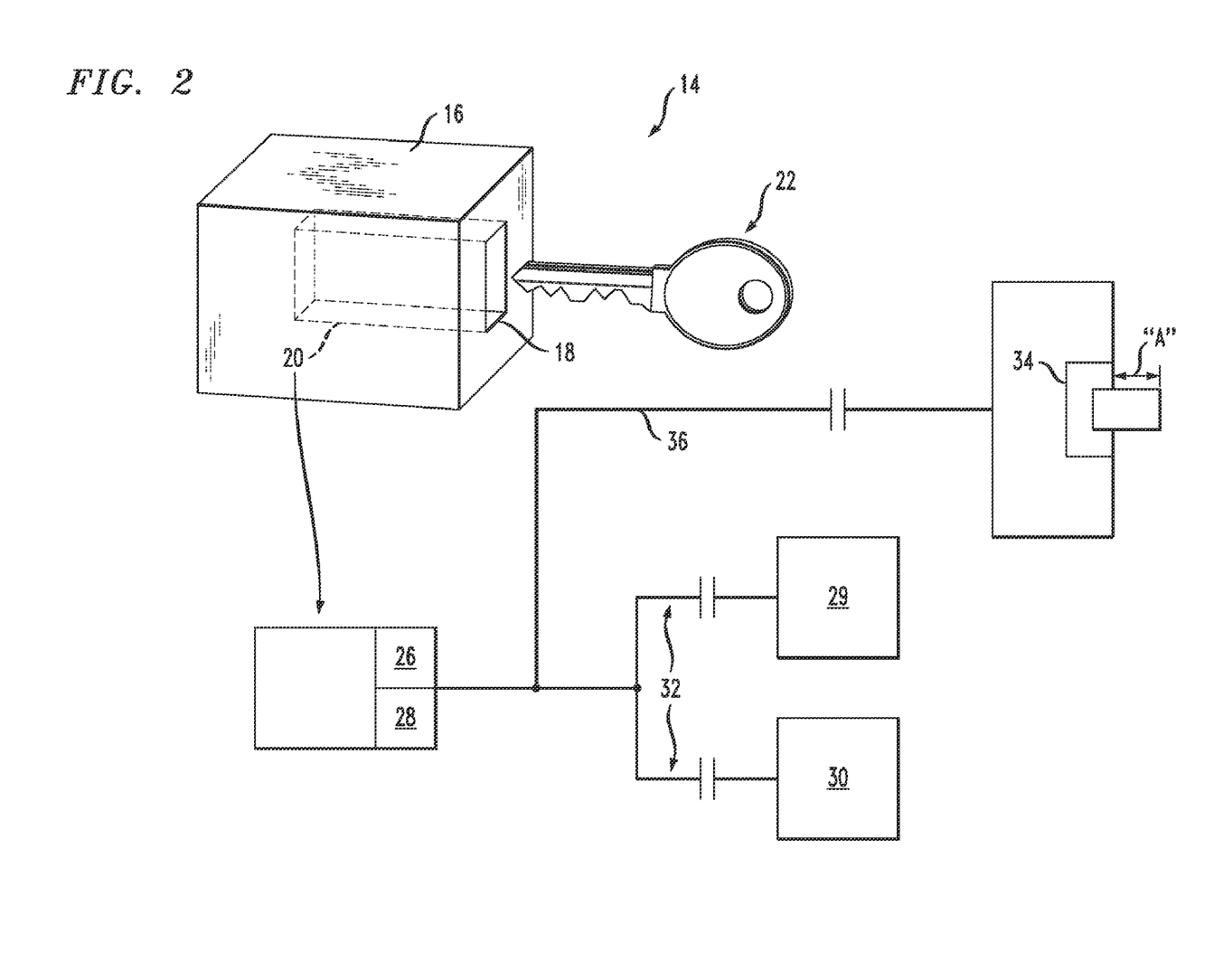
FIG. 2 is a schematic of the disclosed system for using a single key to authenticate a user with respect to multiple user access points.

FIG. 2 shows an exemplary embodiment of an electronic access control system 14 comprising a housing 16 having an insertion receptacle 18 and a translation unit 20 associated therewith. The insertion receptacle 18 may be configured to receive a mechanical key 22 and to position the key adjacent to, or in contact with, the translation unit 20 so that they key can be "read" by the translation unit.

The translation unit 20 may itself comprise a reader 24 having a processor 26 and memory 28 in communication therewith. The translation unit 20 may be self-contained, such that all signal processing and storage functions are performed by components located within or adjacent to the unit. Alternatively, the translation unit 20 may be connected to a centralized control unit 29 located in the user's house, car, business, or other convenient location, such that at least some of the signal processing and storage functions are performed at the centeralized control unit 29. In some further embodiments, the translation unit 20 may be connected to a remote central management facility 30 having its own signal processing and storage capabilities such that some or all of the signal processing and storage functions are performed at the facility. Where the translation unit 20 is connected to a centralized control unit 29 or central management facility 30, the connection may be via a hard wired or wireless communication link 32. If a centeralized control unit 29 is provided in combination with a central management facility 30, the two may also be in communication with each other, either serially or in parallel with the translation unit 20.

Where the translation unit is self contained, the memory 28 may comprise local memory such as RAM, flash memory, or the like. Where the translation unit is connected to a centralized unit 29 or central management facility 30, some or all of the memory 28 may be associated with the unit or facility.

The translation unit 20 may also be connected to a lock actuation mechanism 34 that is operable to lock and unlock the associated door (in the illustrated embodiment, this is done by moving the bolt in the directions of arrow A), to actuate the ignition (car, boat), or to perform any other appropriate access control function such as access control of safes, liquor and gun cabinets, parental control of personal computer access, parental control of TV programming, as well as any application in which biometric access controls are currently used. In addition, the unit 20 could be used as an encryption "key" that could be used to encrypt computer filed using the pattern of a user's particular key. This encryption could be performed via a computer directly, or via a computer peripheral device such as a tape drive, disc drive, flash drive, or the like.

The connection between the translation unit 20 and lock actuation mechanism 34 may be a hard wired or wireless communication link 36. In an alternative embodiment, the lock actuation mechanism 34 may be controlled via the centralized control unit 29 or the central management facility 30, or both.

The communications links 32, 36 may be any of a variety of analog or digital communications forms. Thus, either or both of the communications links may be an analog phone line or it may be a digital transmission line. In addition, a portion or all of the communications links may be a hard wired or wireless connection. A non-limiting list of exemplary technologies making up the communication links includes analog or digital phone lines, fiber optic lines, T1 or T2 lines, public/private networks, wireless (Radio Frequency (RF)), cellular and/or satellite connections. In addition, a portion of the communication links 32, 36 may be a public or private network.

As will be described in greater detail later, the translation unit 20 may generate signals representative of at least one physical contour of an inserted key 22. These signals may undergo a variety of processing steps to filter and/or modify the signals so that data representative of the signals may be stored (for later comparison purposes) or compared to previously-stored data to determine whether the key conforms to a previously-stored profile. It will be appreciated that some or all of the signal processing, storage, and comparison functions can be performed at the translation unit 20, the centralized control unit 29, and/or the central management facility 30. Non-limiting examples of systems that can be used to generate and recognize electronic signals caused by the insertion of a key are disclosed in U.S. Pat. No. 7,397,341 to Bhat et al., and U.S. Pat. No. 6,318,137 to Chaum, the entirety of which are incorporated by reference herein.

Figure 3A:
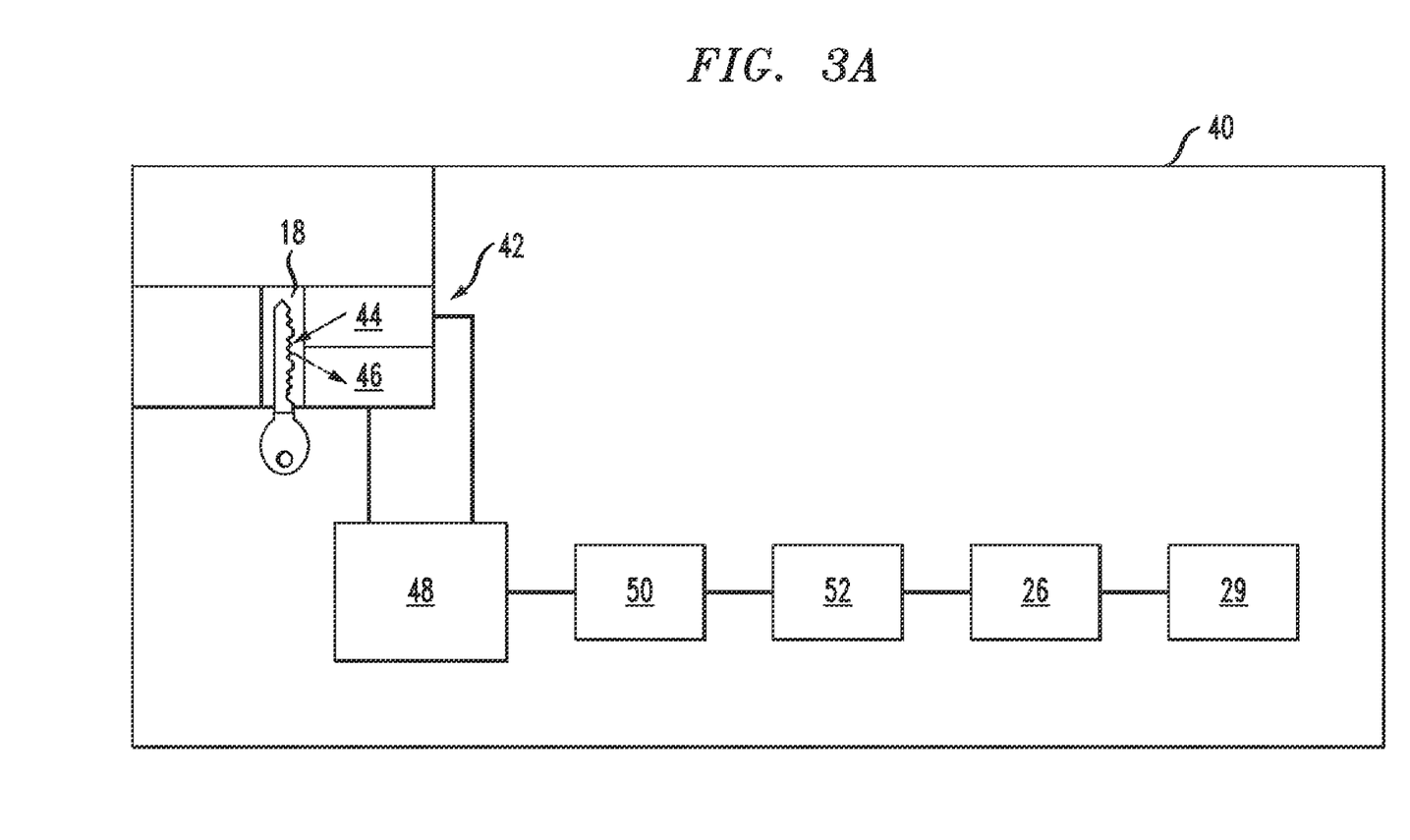
FIGS. 3A-3C are schematics of embodiments of a universal key authentication unit for use in the system of FIG. 2.

Referring now to FIG. 3A, a first exemplary embodiment of a translation unit 40 for use in the system of FIG. 2 is illustrated. In the FIG. 3A embodiment, the translation unit 40 may have a reader 42 comprising a lightwave emitter/detector 44, 46 combination. The emitter 44 may direct light onto the top and/or bottom edge surface (i.e., the surface containing the peaks/valleys) of an inserted key 22, and the detector 46 may receive light that is reflected off the key surface. Since the respective surfaces of the peaks/valleys will be located at different distances from the emitter/detector, the time it takes for light to be reflected back from a peak will be shorter than the time it takes for light to be reflected back from a valley. This difference can be sensed to build an electronic profile of the key 22. Alternatively, the emitter 44 may sense an intensity of the reflected light, which would take into account the fact that a substantial portion of the edge surfaces of the key 22 are not perpendicular to the emitted light beam. Thus, the system may build an electronic profile based on the change in light intensity (i.e., the amount of light reflected back to the detector 46) along the length of the key.

In the illustrated embodiment the emitter 44 and detector 46 are shown positioned the same side of the insertion receptacle 18. As noted, the emitter and detector would be positioned above or below the key, facing at the peaks/valleys of the key. Thus arranged, the detector 46 may detect one or more transitions (e.g., peaks, valleys) in the inserted key, and provide representative signals to the processor 26 associated with the translation unit 40.

The emitter 44 and detector 46 may be connected to a converter 48 that compares the differential between the time and light was sent (from the emitter) to the time the light was received (by the detector) at a particular location along the length of the key. The converter 48 may then generate a time differential pattern for the key at a predetermined sample rate. It will be appreciated that the faster the sample rate, the greater degree of accuracy provided.

The time differential pattern may be provided to a digital pattern generator 50 that takes raw samples of time (i.e., the time between emitting the receiving light at a particular location along the key) or energy/voltage and converts them to digital samples/values. In one exemplary embodiment, the digital pattern generator 50 is an A/D converter. Data may be acquired in real time as the key 22 is being inserted into the insertion receptacle 18. A sensor positioned at the entry of the insertion receptacle 18 may wake up the reader 42 to begin emitting/detecting. Data from the digital pattern generator 50 is provided to a digital pattern filter 52 that includes averaging filters to account for the speed the key was inserted. The filtered data is then provided to the processor 26 (or a processor associated with the centeralized control unit 29 and/or management facility 30) that applies logic to the data and stores it in memory and/or determines whether the data corresponds with previously stored data. In an alternate embodiment, the reader 42 may be arranged so that data is collected only after the key 22 is fully inserted into the insertion receptacle 18. In this embodiment, a sensor may be positioned at the rear of the insertion receptacle that, when tripped, wakes up the reader. The emitter/detector pair may then mechanically scan the entire length of the key to obtain an electronic profile of the key as previously described.

Alternatively, the reading may take place upon removal of the key 22 from the receptacle 18. In this embodiment, a sensor positioned at the rear of the insertion receptacle may be tripped when the key is inserted. Upon removal, the sensor turns off, which wakes up the reader. The emitter/detector pair may then scan the key as it is being removed from the receptacle.

In one embodiment, the reader 42 may comprise a plurality of emitters 44 and/or a plurality of detectors 46. The emitters 44 may comprise laser light sources, such as laser light emitting diodes (LEDs), while the detectors 46 may comprise photodetectors. The emitters and detectors need not be limited to LEDs and photodetectors, and any of a variety of techniques for reading the peaks and valleys of a key can be employed.

To actuate the reader 42, the key 22 may be inserted into the insertion receptacle 18 and turned in a manner similar to that used to open a traditional mechanical lock. In other embodiments, the key needn't be turned, but instead will be automatically read by the reader 42 upon insertion into the insertion receptacle 18. In such embodiments, the emitter 44 may be continually active, so that when the key is inserted into the insertion receptacle 18 the detector 46 automatically provides the appropriate signals for processing.

In further embodiments, an additional sensor (not shown) may be positioned adjacent to the insertion receptacle 18 to sense the presence of the key in the insertion receptacle 18 upon the application of a minimal insertion force. This embodiment will result in a system having reduced power consumption since it would not require the emitter 44 to be continually active.

The generated signals may be stored in local memory 28, or, where a centralized control unit 29, and/or central management facility 30 are used, the generated signals may be transmitted to the control unit 29 and/or management facility 30 for processing and storage. Where the signals are transmitted to the control unit 29 and/or management facility, the signals may be encrypted to provide an additional level of security.

Although the illustrated embodiment shows these processing and storage functions being provided locally within the translation unit 40, it will be appreciated that some or all of the processing and storage functions may be performed by devices associated with the centralized control unit 29 and/or management facility 30.

The translation unit 40 of this embodiment may be used in multiple modes: (1) a learning mode, and (2) a verification mode. In the learning mode, signals from the detector 46 are processed and data representative of the signals is stored in memory. As previously noted, the processing and storage functions may be performed locally (e.g., using processor 26 and memory 28), or they may be performed at the centralized control unit 29, and/or the central management facility 30. The stored data may then be used for future comparisons when the key is reinserted to actuate the lock at a later time/date.

In the verification mode, the stored data is compared with new incoming data from the detector 46 to determine whether the incoming data correspond sufficiently to the stored data. In one embodiment, this could be implemented by comparing time/sample count vs. energy/level. Thus, at a particular sample point (corresponding to a known location along the length of the key), a particular peak/valley energy reading would be expected based on the stored data. If the level for that sample does not correspond with the stored value a filter may check ± a certain number of samples to see if a matching energy/level reading can be found. If a matching reading is found, the filter may then use a sample offset to verify the remaining samples vs. energy/level by compensating for the slight positioning error. If an entire key pattern is matched, but only with slight variances due to key wear and tear, the stored pattern may be updated. Exact tolerance values would be based on sample rate and accuracy of the light transmitter and receiver. If appropriate correspondence is found, then the processor 26 may signal the lock actuation mechanism 34 to lock or unlock the door, to start the car, allow access, etc.

The translation unit may be switched between "learning" and "verification" modes by the user. During system installation a master code may be assigned to a user, and that user may allow others to enter their access codes to "enroll" their keys into the system by inserting their individual key into the translation unit (or any other translation unit associated with the system). Toggling between "learning" and "verification" modes can be controller at the translation unit, the centralized control unit 29, or the central management facility 30.

Figure 3B:
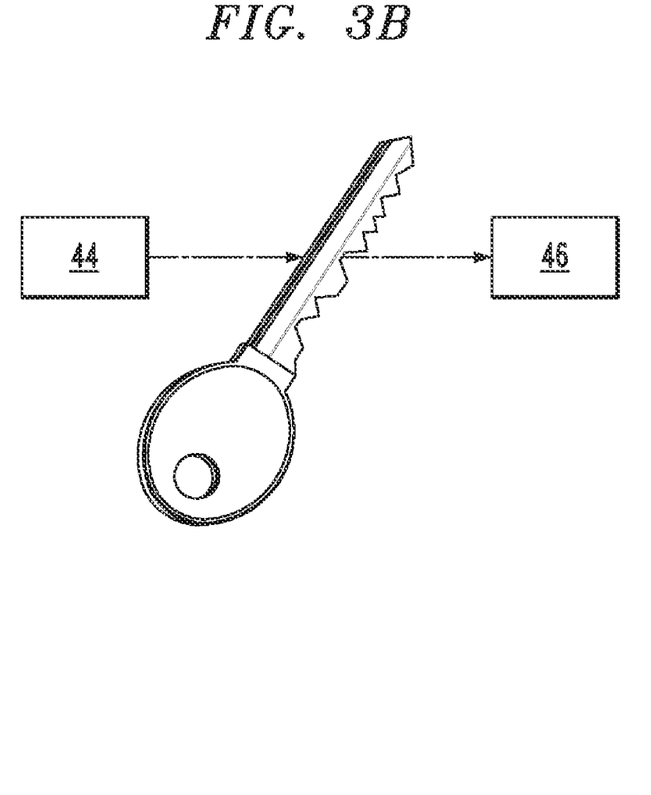

Although the embodiment of FIG. 3A provides the emitter 44 and detector 46 on the same side of the insertion receptacle 18, in an alternative embodiment, shown in FIG. 3B, the emitter 44 and detector 46 may be positioned on opposite sides of the insertion receptacle 18 to obtain a "side shot," or profile view of an inserted key 22. In this embodiment, the detector 46 would comprise a plurality of photodetectors, and an electronic profile pattern would be generated based on those photodetectors that receive light transmitted past the key 22. This electronic pattern would then be stored (where the system is in learning mode), or would be compared to previously stored data (where the system is in verification mode). As with previous embodiments, one emitter/detector pair may be used if the scanning were done during key insertion or removal. Alternatively, scanning could be performed once the key has been inserted, using for example, a single emitter 44 a rotating mirror that would scan the single light beam across the length of the key. The scanned light would be received using multiple detectors 46, and would be used to generate an electronic pattern for the key in the manner described in relation to the previous embodiments.

Figure 3C:
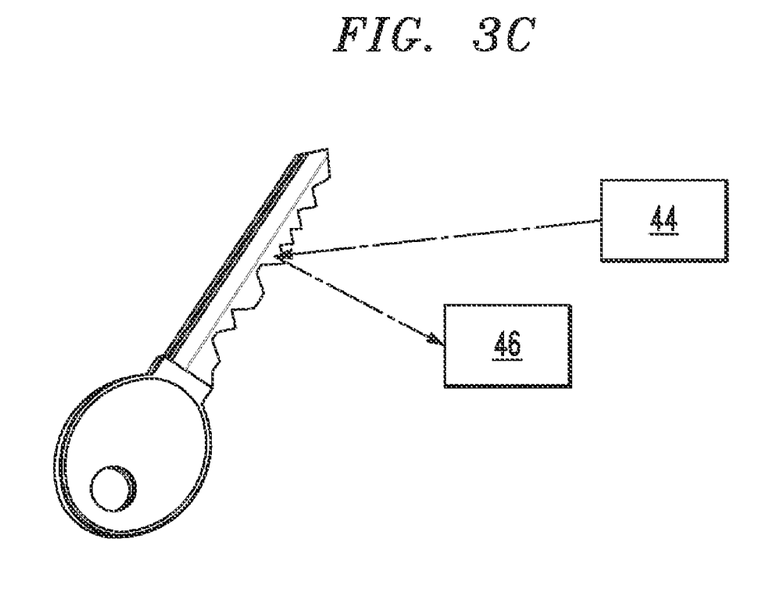

As a further alternative, shown in FIG. 3C, the emitter 44 and detector 46 may be positioned on the same side of the key 22 to obtain an electronic profile of the key. In this embodiment, the emitter 44 would direct light against the side of the key (as opposed to the top edge of the key as with the FIG. 3A embodiment), and the detector 46 would detect the light reflected off the side. The reflected light would be used to generate an electronic pattern as previously described. In one embodiment, the internal surfaces of the reader positioned opposite the emitter/detector may have a black matte finish so that only the key surfaces will reflect light back to the detector. As with previous embodiments, one or more emitters and detectors may be used. In addition, the reading could be taken while the key is being inserted, while it is stationary within the receptacle 18, or while it is being removed.

Figure 4:
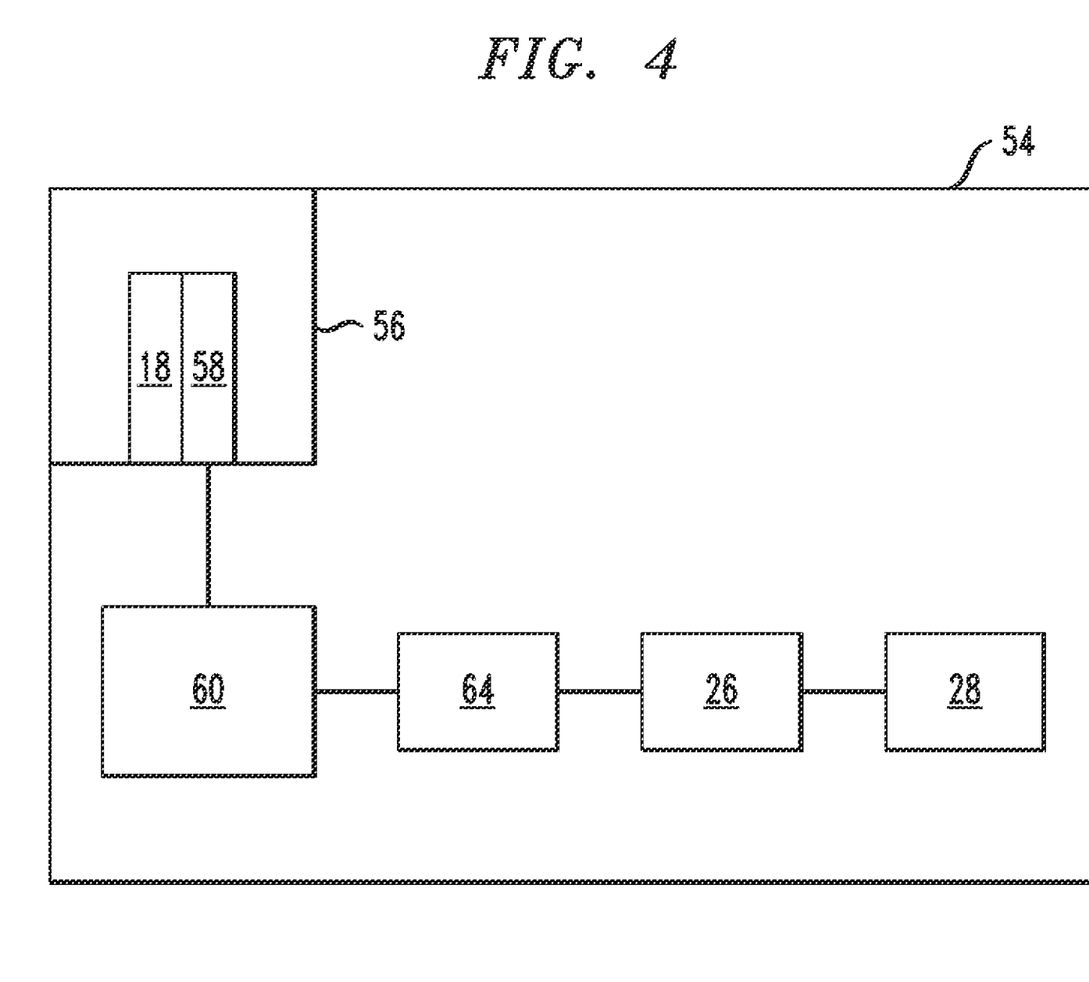
FIG. 4 is a schematic of a second embodiment of a universal key authentication unit for use in the system of FIG. 2.

Referring now to FIG. 4, another exemplary embodiment of a translation unit 40 for use in the system of FIG. 2 is illustrated. The translation unit 54 may comprise a reader 56 having a processor 26 and memory 28 in connection therewith. As with the previous embodiment, the translation unit 56 may be self-contained (i.e., all processing and storage functions are performed using components within the translation unit), or it may be connected to a centralized control unit 29, and/or the central management facility 30. Where the translation unit is self contained, the memory 28 may comprise local memory such as RAM, flash memory, or the like. Where the translation unit is connected to a centralized control unit 29, and/or the central management facility 30, some or all of the memory may be housed with the control unit and/or management facility.

In the FIG. 4 embodiment, the reader 56 may comprise a piezoelectric element 58 that is responsive to mechanical vibrations caused by the insertion of the key 22 into the insertion receptacle 18. Since the peak/valley arrangement of a particular key is substantially unique the vibrations caused by the peaks/valleys of that key result in a substantially unique insertion vibration profile for the key. The piezoelectric element 58 can translate the mechanical vibration profile into electrical signals which can be used to uniquely identify the key 22. In one embodiment, the piezoelectric crystal may be placed on a piston controlled by a spring air or the like, and as the key 22 is inserted into the insertion receptacle, the peaks would produce a higher energy level and the valleys a lower energy level, corresponding to the force with which the piston impinges on the crystal. In another embodiment, the piezoelectric crystal may be simply be mounted on or in proximity to the insertion receptacle 18, and may sense any vibrations caused by the insertion of the key into the receptacle. An example of such a piezoelectric-based recognition subsystem is disclosed in U.S. Pat. No. 7,397,341 to Bhat, et al., the entirety of which is incorporated by reference herein.

As shown, the piezoelectric element 58 may be connected to an analog to digital (A/D) converter 60, which converts voltage levels to weighted digital values at a predetermined sample rate. As previously noted, the faster the sample rate, the greater the accuracy provided. The values, in turn, are provided to a digital pattern filter 64 that includes averaging filters to account for the speed the key was inserted. The filtered data is then provided to the processor 26 (or a processor associated with the centralized control unit 29 and/or management facility 30) that applies logic to the data and stores it in memory and/or determines whether the data corresponds with previously stored data.

The translation unit 54 of this embodiment may be used in multiple modes: (1) a learning mode, and (2) a verification mode, in the manner previously described in relation to the embodiment of FIG. 3.

To actuate the reader 56, the key 22 may simply be inserted into the insertion receptacle 18. The insertion action serves to facilitate the aforementioned mechanical vibrations which are converted to electrical signals by the piezoelectric crystal of the piezoelectric element 58. Because the reader 56 converts mechanical force to electrical signals, the reader of this embodiment would have a zero power draw factor.

Figure 5:
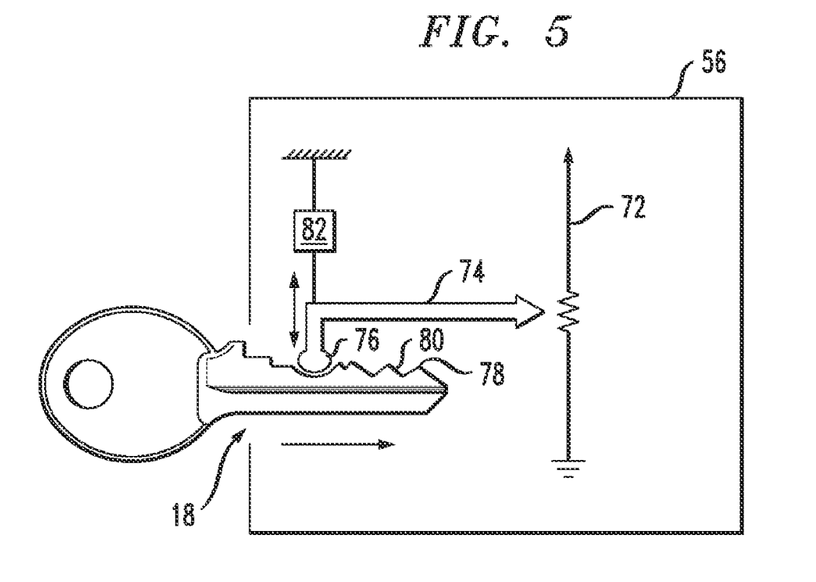
FIG. 5 is a schematic of a third embodiment of a universal key authentication unit for use in the system of FIG. 2.

In a further embodiment, shown in FIG. 5, the reader 56 may include a variable resistor 22 in lieu of the piezoelectric element 58, to generate a unique electrical signal profile for a particular key 22. Thus, the slider 74 of the variable resistor 72 may include a roller 76 at one end that contacts the peaks 78 and valleys 80 of the key 22 as the key is inserted into the insertion receptacle 18. The roller 76 may be held in contact with the key surface via a spring or piston 82. As the key is inserted, the slider 74 follows the up/down motion associated with the peaks and valleys of the key 22, thereby changing the resistance of the variable resistor 72 in a unique pattern accordance with the peak/valley profile of the key. An electrical signal pattern may be generated from this resistance change, and this pattern can be processed and stored in the same manner as the signals from the piezoelectric element 58 described in relationship to the embodiment of FIG. 4.

It will be appreciated that a variable capacitor could be used in lieu of a variable resistor 72 to generate the desired electrical pattern. Alternatively, the position of the slider 74 could be optically measured and translated into an electronic pattern of the key.

In yet a further embodiment, the reader 56 may comprise an electro-magnet in lieu of the piezoelectric element 58 such that when the key is inserted into the insertion receptacle 18 the magnet senses discrete local changes in the magnetic field caused by the unique mechanical profile of the key. This field change can then be processed and stored in the same manner as the signals from the piezoelectric element 58. Magnetic shielding may be employed in or around the translation unit to prevent external metal and magnetic fields from interfering with the reading.

Although the illustrated embodiment shows the processing and storage functions being provided locally within the translation unit 54, it will be appreciated that some of all of the processing and storage functions may be performed by devices associated with the centralized control unit 29 and/or management facility 30.

In one embodiment, the reader 56 may comprise a plurality of piezoelectric elements 58.

Figure 6:
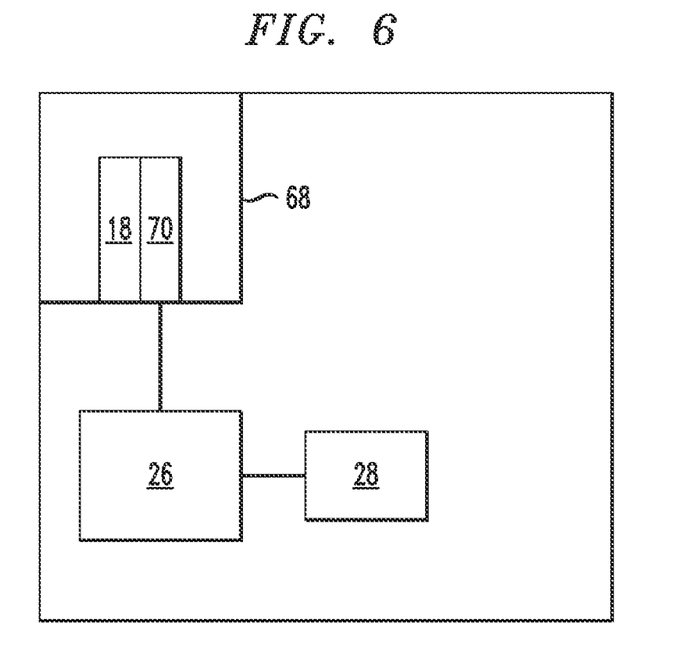
FIG. 6 is a schematic of a fourth embodiment of a universal key authentication unit for use in the system of FIG. 2.

Referring now to FIG. 6, a further exemplary embodiment of a translation unit 66 for use in the system of FIG. 2 is illustrated. The translation unit 66 may comprise a reader 68 having a processor 26 and memory 28 in connection therewith. As with the previous embodiments, the translation unit 66 may be self-contained (i.e., all processing and storage functions are performed using components within the translation unit), or it may be connected to a centralized control unit 29, and/or the central management facility 30. When the translation unit is self-contained, the memory 28 may comprise local memory such as RAM, flash memory, or the like. Where the translation unit is connected to a centralized control unit 29, and/or the central management facility 30, some or all of the memory may be housed with the control unit and/or management facility.

In the FIG. 6 embodiment, the reader 68 may comprise an image acquisition device 70, such as a charge coupled device camera, that is configured to record image data relating to a contour or profile of a key 22 inserted into the insertion receptacle 18. To actuate the image acquisition device 70, they key 22 may be inserted into the insertion receptacle 18. A sensor (not shown) positioned adjacent to the insertion receptacle 18 senses when the key is fully inserted into the receptacle, and actuates the image acquisition device 70 to obtain image data representative of the key profile. This image data may be transmitted to the processor 26 for analysis and/or storage in memory 28.

Two dimensional pattern matching may be employed to determine whether an inserted key matches a stored key profile. Where the image acquisition device 70 can discern color, the color of a particular key may be used as a "match" variable. In this regard, the system may be calibrated to learn the particular color or hue of a user's key, or it could be programmed to recognize a key of a particular predetermined color (e.g., blue, red) or having a particular color or other pattern or marking (e.g., engraved text) thereon.

In one exemplary embodiment, the image acquisition device 70 may capture an image of the key 22 in black and white, with the key sowing as a white image on a black background. The image may thus be pixel based, with the pixels making up a grid of rows and columns. Starting from one side of the image, the image may be evaluated for "white" pixels. A white pixel count per column may then be stored in memory as a "sample." All of the column data would then make up the pattern or profile for the key. To verify whether a key "matches" with a stored key profile, each column of an incoming image may be analyzed for the existence of white pixels, and the pattern of white pixels may be compared with the stored pattern to determine correspondence.

Variances may be accommodated by triggering the sample comparison only when the first column with white pixels is sensed. Hence, if the key is slightly off position in the vertical or horizontal direction, it will not matter since it is the white pixel count per column that is used for verification (and not the absolute column position in which the first white pixel(s) are detected in or where in the column the white pixel(s) are). Tolerances for pixel variances per column and row may be adjusted based on image resolution of the image acquisition device 70.

The translation unit 66 of this embodiment may be used in multiple modes: (1) a learning mode, and (2) a verification mode, in the manner previously described in relation to the embodiment of FIG. 3.

Although the illustrated embodiments shows the processing and storage functions being provided locally within the translation unit 66, it will be appreciated that some or all of the processing and storage functions may be performed by devices associated with the centralized control unit 29 and/or management facility 30.

In addition, although FIG. 6 shows a single image acquisition device 70, it will be appreciated that multiple such devices may also be provided.

The disclosed system enables a single key (e.g., a car key) to be used to operate a multiplicity of access controls, or enables multiple users to utilize their own unique keys to access a single access control, where such access controls include residence or business access doors, security systems and the like. By providing a "learning mode," the user can teach the individual access control devices to recognize the user's key, and to authenticate that user each time that same key is inserted into the access control device. In addition, the system can allow each access control device to recognize multiple different physical keys. In one exemplary embodiment, the system may be used to allow a number of family members to unlock the front/back doors of the house and to arm/disarm the home security system using their own unique keys. In another embodiment, the system may be used to selectively enable user access on a key-by-key basis to enable or disable access for a particularly key/user without affecting the ability of other keys in the system to access desired control points.

In another embodiment, the system may continually or periodically update the signal information stored in memory. In one embodiment, each time a key is inserted into the insertion receptacle and its authenticity verified, the stored signal data may be replaced, modified, or overwritten with the most recently obtained signal data. Future verifications of a key would then be based on the updated stored signal data. In an alternative embodiment, a weighted average of the stored signal data and the most recently obtained signal data may be computed and stored for future verifications. Other combinations of a new and previously-existing stored data may also be stored for future verifications. This update feature may reduce the likelihood that changes in the physical characteristics of an individual key over time will result in an unwanted rejection of the key. Updates may be performed automatically and/or manually.

The disclosed transition units 20, 40, 54, 66 may include one or more processors equipped to receive and process the signals generated by the associated readers. As will be appreciated, the nature of the signal (analog vs. digital) is not critical to the disclosed system, and any of a variety of input signals may be received and processed by the processor(s). Depending on the nature of the input signal, however, a variety of filtering, amplifying and processing (e.g., digital signal processor (DSP)) components may be provided upstream of the processor, as will be appreciated by one of ordinary skill in the art.

In addition, once a particular key has been "learned" by a translation unit, the access control system 14 system may enable that key 22 to be used to selectively authenticate the bearer of the key at one or more access control locations controlled by the system. Thus, in one embodiment, a user may insert the key 22 into a translation unit at a first location, whereupon the system 14 may "learn" that key's profile. The system may then be used to grant access authorization to that key 22 for one or more access control locations (car, house, arm/disarm security system, etc.). This access authorization may be granted at one of the translation units 20, 40, 54, 66, or at the centralized control unit 29 and/or the central management facility 30. Access authorization for a particular key may be controlled by date, time and/or other desired criteria. For example, certain keys may be provided access to only certain access points in the system (e.g., a teen's key may access the home door locks but not the car ignition after a particular time of day).

Figure 7:
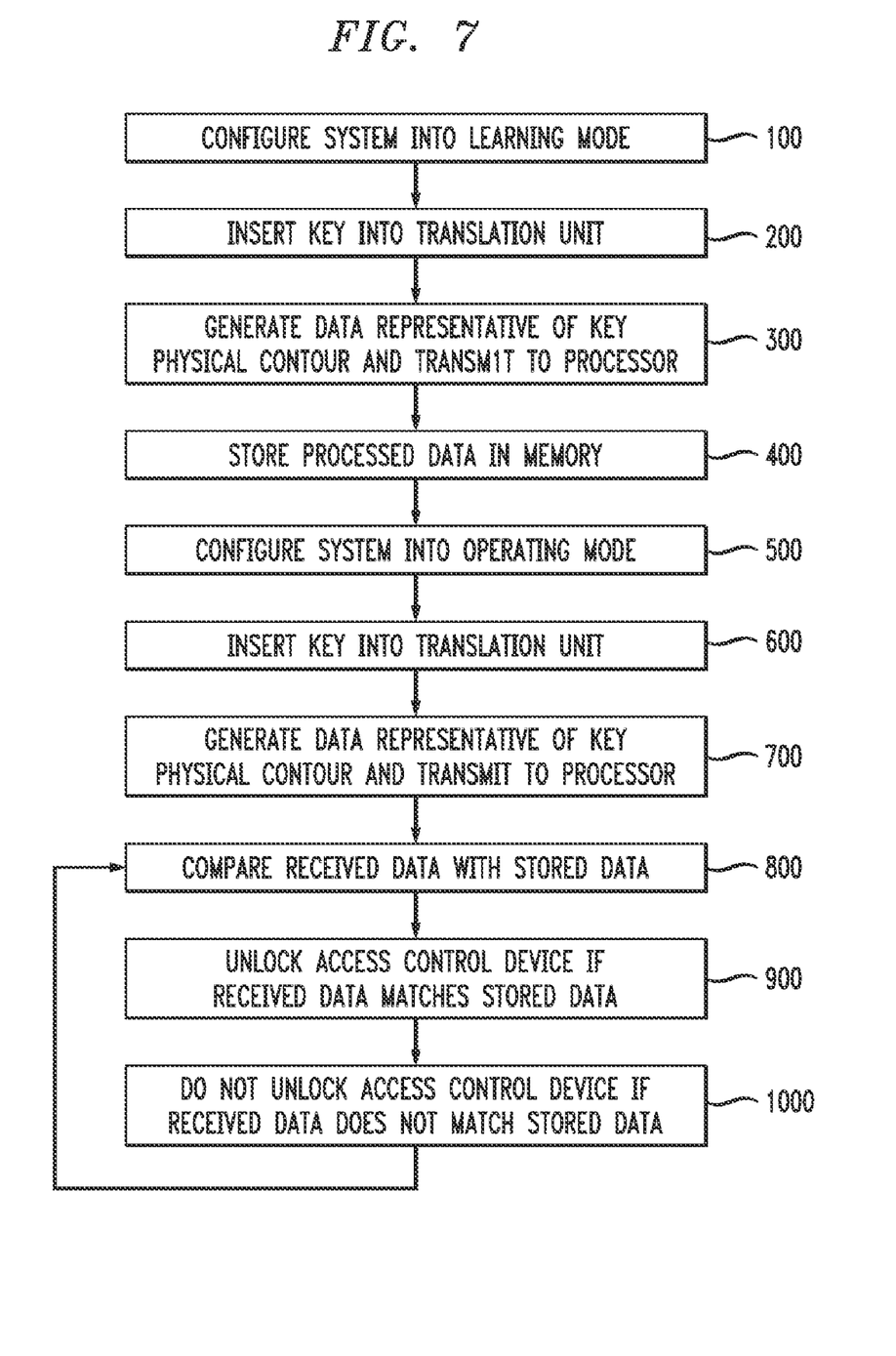
FIG. 7 is a flowchart describing an exemplary method for using a single key to authenticate a user with respect to multiple user access points.

Referring to FIG. 7, a method of operating the system 1 will now be described. At step 100, the user places the system in learning mode. At step 200, the user inserts the key 22 into the insertion receptacle 18 associated with a translation unit device 20, 40, 54, 66. At step 300, the translation unit 20, 40, 54, 66 generates data representative of the physical contour or profile of the key and transmits that electronic data to the processor 26. The processor stores at least a portion of the electronic data in memory 28 at step 400. At step 500, the system is placed in operation mode. Later, when access is desired, the user inserts the key 22 into the insertion receptacle 18 of the translation unit 20, 40, 54, 66 at step 600. At step 700, the translation unit obtains electronic data representative of the physical contour or profile of the key and transmits that electronic data to the processor 26. At step 800, the processor compares the received electronic data with the electronic data stored in memory 28. If the processor concludes that the received data matches the stored data, then at step 900 the lock actuation mechanism 34 is instructed to lock or unlock the access control device. If the processor concludes that the received data does not match the stored data, then at step 1000 the the lock actuation mechanism 34 is not instructed to lock or unlock the access control device and may also issue an alarm. The system may be configured to recognize the state of an access control device (i.e., locked or unlocked), and to instruct the access control device accordingly when presented with an authorized key 22. Thus, if the access control device is locked, and the system verifies that a presented key is authorized, then the access control device will be instructed to unlock. Alternatively, if the access control device is unlocked, and the system verifies that a presented key is authorized, then the access control device will be instructed to lock.

In one embodiment, the step of comparing the received electronic data with the stored data further may comprise writing the received electronic data to memory, and using the newly stored electronic data for comparison with future received data from the processor.

In addition, any of the above readers may be employed in combination with one or more biometric verifications to provide an additional level of security for an access point. A non-limiting list of appropriate biometric verifications includes fingerprint recognition, iris/retinal recognition, facial recognition, and the like.

Although the foregoing description has generally referred to the system's application to "locking" or "unlocking" an access control device, it will be appreciated that the system is broadly applicable to the general concept of access control identification. Thus, once a user is positively identified (via the user's key), the system may then be used to grant the user appropriate access whether it be the unlocking of a door, the arming/disarming of a security system, the silencing of an alarm, or the like.

The functions and process steps herein may be performed automatically or wholly or partially in response to user command. An activity (including a step) performed automatically is performed in response to executable instruction or device operation without user direct initiation of the activity.

The systems and processes of FIGS. 1-7 are not exclusive. Other systems and processes may be derived in accordance with the disclosed principles to accomplish the same objectives. Although the system and method have been described with reference to particular embodiments, it is to be understood that the embodiments and variations shown and described herein are for illustration purposes only. For example, it will be appreciated that although the disclosed systems and methods have been described in relation to an exemplary residential application, the systems and methods will have equal applicability to any of a variety of commercial applications.

In addition, modifications to the disclosed systems and methods may be implemented by those skilled in the art, without departing from their scope. The systems and methods may, in alternative embodiments, be located on one or more (e.g., distributed) processing devices accessing a network linking the elements of FIGS. 1-6. Further, any of the functions and steps provided in FIG. 7 may be implemented in hardwire, software or a combination of both and may reside on one or more processing devices located at any location of a network linking the elements of FIGS. 1-6 or another linked network, including the Internet.

Accordingly, it is intended that the invention not be limited to the described embodiments, but that it has the full scope defined by the language of the following claims, and equivalents thereof.

What is claimed is:

1. A method for providing access, comprising:
   at a controller, receiving electronic signal data representative of a contour of a first key presented by a first user at a first access location;
   comparing the electronic signal data with stored electronic signal data, the stored electronic signal data associated with an authorized key, wherein an energy reading from a particular sample point in the received electronic signal data is compared against a particular energy level in the stored electronic signal data, and when the energy reading from the sample point in the received electronic signal data does not match the energy level in the stored electronic signal data, comparing a number of additional sample points above and below the particular sample point against the particular energy level to determine if one of the additional sample points matches the particular energy level;
   instructing the first access location to allow access to the user if the electronic signal data matches the stored electronic signal data; and
   when the electronic signal data deviates from the stored electronic signal data by at least a predetermined amount, modifying the stored electronic signal data based on the deviated electronic signal data and re-designating the modified electronic signal data as the stored electronic signal data.

2. The method of claim 1, further comprising:
   at the controller, receiving electronic signal data representative of the contour of the first key presented by the user at a second access location;
   comparing the electronic signal data with the stored electronic signal data; and
   instructing the second access location to allow access to the user if the electronic signal data matches the stored electronic signal data.

3. The method of claim 1, wherein the stored electronic signal data is further associated with an authorized user.

4. The method of claim 1, wherein the first access location is selected from the list consisting of an ignition, a door lock, a security system, a safe and a computer.

5. The method of claim 1, wherein the stored electronic signal data is generated at a first time, and the step of receiving electronic signal data representative of a contour of a key occurs at a second time, wherein the second time is later than the first time.

6. The method of claim 5, further comprising the step of generating the electronic signal data based on the contour of the key.

7. The method of claim 6, wherein the generating step comprises using a piezoelectric crystal to convert mechanical vibrations of the key inserted in an insertion receptacle into electronic signals.

8. The method of claim 6, wherein the generating step comprises emitting light from a light emitter onto a surface of the key, detecting light emitted from the light emitter using a light detector, and converting the detected light into the electronic signal data.

9. The method of claim 6, wherein the generating step comprises sliding a slider along a variable electrical component in response to a movement of the key into an access control device, the slider moving according to a contour of the key, the slider changing an electrical characteristic of the variable electrical component, and generating an electronic signal representative of the changed characteristic.

10. The method of claim 6, wherein the generating step comprises sensing a local magnetic field change with an electromagnet, wherein the local magnetic field change is caused by a movement of the key into an access control device, and generating an electronic signal representative of the magnetic field change.

11. The method of claim 6, wherein the generating step comprises obtaining image data representative of a contour of the key using an imaging device, wherein the image data comprises the electronic signal data.

12. The method of claim 1, wherein the first access location comprises a computer or computer peripheral device, and the step of instructing the one of a plurality of access locations to allow access comprises encrypting or decrypting a computer file.

13. A system for access control, comprising:
   a processor;
   a controller;
   a first access control device; and
   a non-transitory machine-readable storage medium encoded with a computer program code such that, when the computer program code is executed by the processor, the processor performs the steps comprising:
      at a controller, receiving electronic signal data representative of a contour of a first key presented by a first user at a first access location;
   comparing the electronic signal data with stored electronic signal data, the stored electronic signal data associated with an authorized key, wherein an energy reading from a particular sample point in the received electronic signal data is compared against a particular energy level in the stored electronic signal data, and when the energy reading from the sample point in the received electronic signal data does not match the energy level in the stored electronic signal data, comparing a number of additional sample points above and below the particular sample point against the particular energy level to determine if one of the additional sample points matches the particular energy level;
      instructing the first access location to allow access to the user if the electronic signal data matches the stored electronic signal data; and
      when the electronic signal data deviates from the stored electronic signal data by at least a predetermined amount, modifying the stored electronic signal data based on the deviated electronic signal data and re-designating the modified electronic signal data as the stored electronic signal data.

14. The system of claim 13, wherein the method performed by the processor further comprises:
   at the controller, receiving electronic signal data representative of the contour of the first key presented by the user at a second access location;
   comparing the electronic signal data with the stored electronic signal data; and
   instructing the second access location to allow access to the user if the electronic signal data matches the stored electronic signal data.

15. The system of claim 13, wherein the stored electronic signal data is further associated with an authorized user.

16. The system of claim 13, wherein the first access location is selected from the list consisting of an ignition, a door lock, a security system, a safe and a computer.

17. The system of claim 13, wherein the stored electronic signal data is generated at a first time, and the step of receiving electronic signal data representative of a contour of a key occurs at a second time, wherein the second time is later than the first time.

18. The system of claim 17, wherein the method performed by the processor further comprises the step of generating the electronic signal data based on the contour of the key.

19. The system of claim 17, wherein the generating step comprises using a piezoelectric crystal to convert mechanical vibrations of the key inserted in an insertion receptacle into electronic signals.

20. The system of claim 17, wherein the generating step comprises emitting light from a light emitter onto a surface of the key, detecting light emitted from the light emitter using a light detector, and converting the detected light into the electronic signal data.

21. The system of claim 17, wherein the generating step comprises sliding the slider along a variable electrical component in response to a movement of the key into an access control device, the slider moving according to a contour of the key, the slider changing an electrical characteristic of the variable electrical component, and generating an electronic signal representative of the changed characteristic.

22. The system of claim 17, wherein the generating step comprises sensing a local magnetic field change with an electromagnet, wherein the local magnetic field change is caused by a movement of the key into an access control device, and generating an electronic signal representative of the magnetic field change.

23. The system of claim 17, wherein the generating step comprises obtaining image data representative of a contour of the key using an imaging device, wherein the image data comprises the electronic signal data.

24. The system of claim 13, wherein the first access location comprises a computer or computer peripheral device, and the step of instructing the one of a plurality of access locations to allow access comprises encrypting or decrypting a computer file.

25. The method of claim 1,
   wherein when one of the additional sample points matches the particular energy level, comparing the remaining sample points in the received electrical data signal against the remaining energy levels in the stored electrical data while employing a sample offset.

26. The system of claim 13,
   wherein when one of the additional sample points matches the particular energy level, comparing the remaining sample points in the received electrical data signal against the remaining energy levels in the stored electrical data while employing a sample offset.

* * * * *